Feb. 10, 1970  R. J. DONNER ET AL  3,495,129
INVERTER PROTECTION SCHEME
Filed Nov. 16, 1967  3 Sheets-Sheet 1
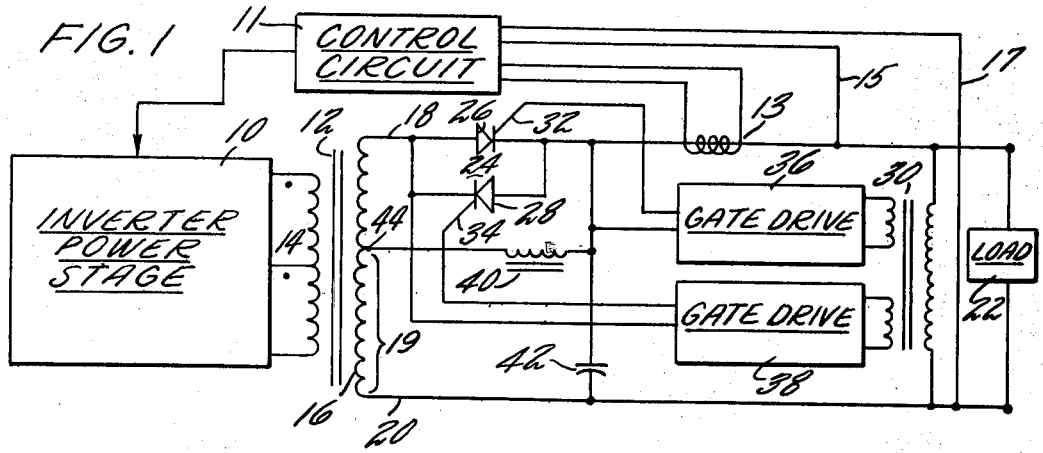
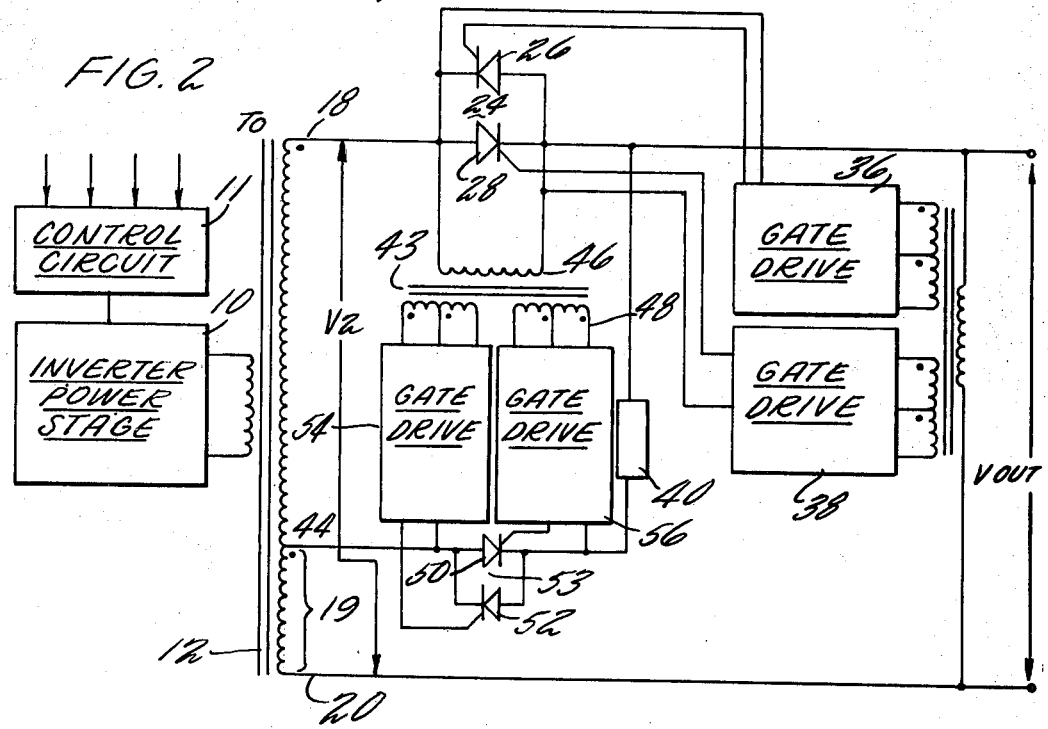
INVENTORS
ROBERT J. DONNER
MARK M. MERRIAN
BY Louis H. Reens
ATTORNEY

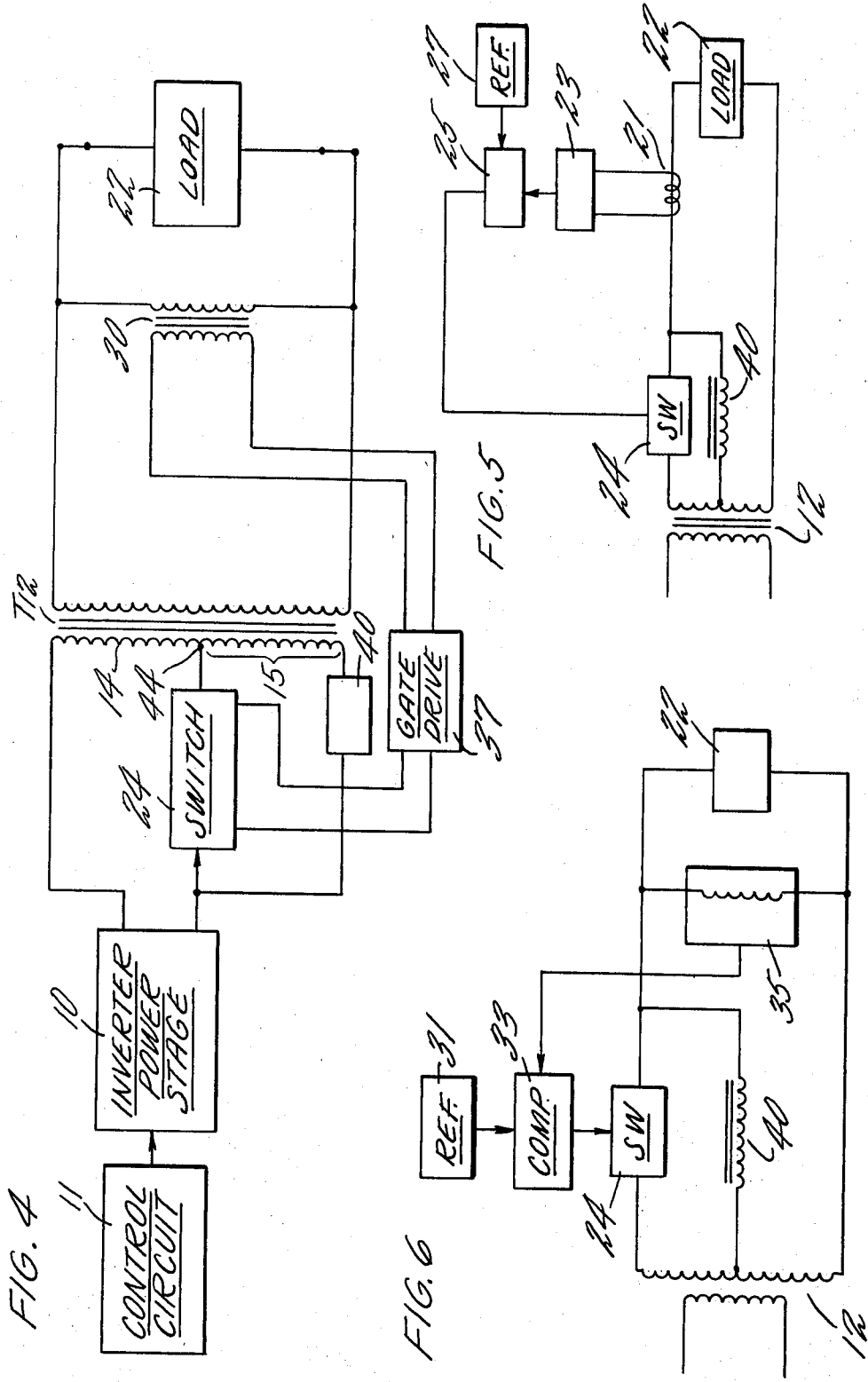

United States Patent Office 3,495,129
Patented Feb. 10, 1970

3,495,129
INVERTER PROTECTION SCHEME
Robert J. Donner, Longmeadow, Mass., and Mark M. Merrian, Bloomfield, Conn., assignors to United Aircraft Corporation, East Hartford, Conn., a corporation of Delaware
Filed Nov. 16, 1967, Ser. No. 683,498
Int. Cl. H02h 7/14, 9/00, 7/00
U.S. Cl. 317—14                          11 Claims

ABSTRACT OF THE DISCLOSURE

A short circuit protector for an inverter is disclosed. The load voltage closes a switch comprising a pair of controlled rectifiers, so that current from the inverter power stage may be passed through the switch to the load. A transformer having a first normal operating turns ratio is interposed between the switch and the AC inverted source. An intermediate tap in the secondary of the transformer is coupled through an inductance in parallel with the switch. Upon the ocurrence of a load short circuit, the drive for the controlled rectifiers is removed, the switch is opened and the load becomes connected to the AC inverted power source through the additional inductance and via the intermediate tap in the secondary of the transformer.

BACKGROUND OF THE INVENTION

In the patent to Powell et al. 3,323,017, an overload protector for a source of electrical power is disclosed. In this circuit the AC power from a static inverter is coupled via a transformer to the load, and in series connection with the load are a pair of parallel but oppositely connected silicon controlled rectifiers. Also in parallel with the controlled rectifiers is an inductance which aids in reducing the short circuit current when these silicon controlled rectifiers are rendered non-conductive by a short circuit sensor. Although this circuit aids in reducing the short circuit current by inserting the inductance automatically, further protection may be needed for the output power stage of the static inverter. This additional protection is provided by a novel turns ratio changing means and is the subject of this invention.

SUMMARY OF THE INVENTION

Accordingly, it is an object of this invention to provide a circuit protector which upon the recognition of a short or excessive power demand by a load alters the effective turns ratio of a transformer coupling an AC power source to a load to thereby reduce the primary circuit current and permit a reduction in the rating of the power stage amplifier.

DESCRIPTION OF THE PREFERRED EMBODIMENT

This object is accomplished with a circuit of which several embodiments are shown in the drawings wherein:

FIG. 1 illustrates the simplest form of the turns ratio changing means.

FIG. 2 illustrates a preferred embodiment of this invention.

FIG. 4 illustrates the embodiment of this invention in the primary of the transformer.

FIG. 5 illustrates a general excessive load current protective circuit responsive to load currents.

FIG. 6 illustrates a general excessive load current protective circuit responsive to load voltage.

Figure 3:
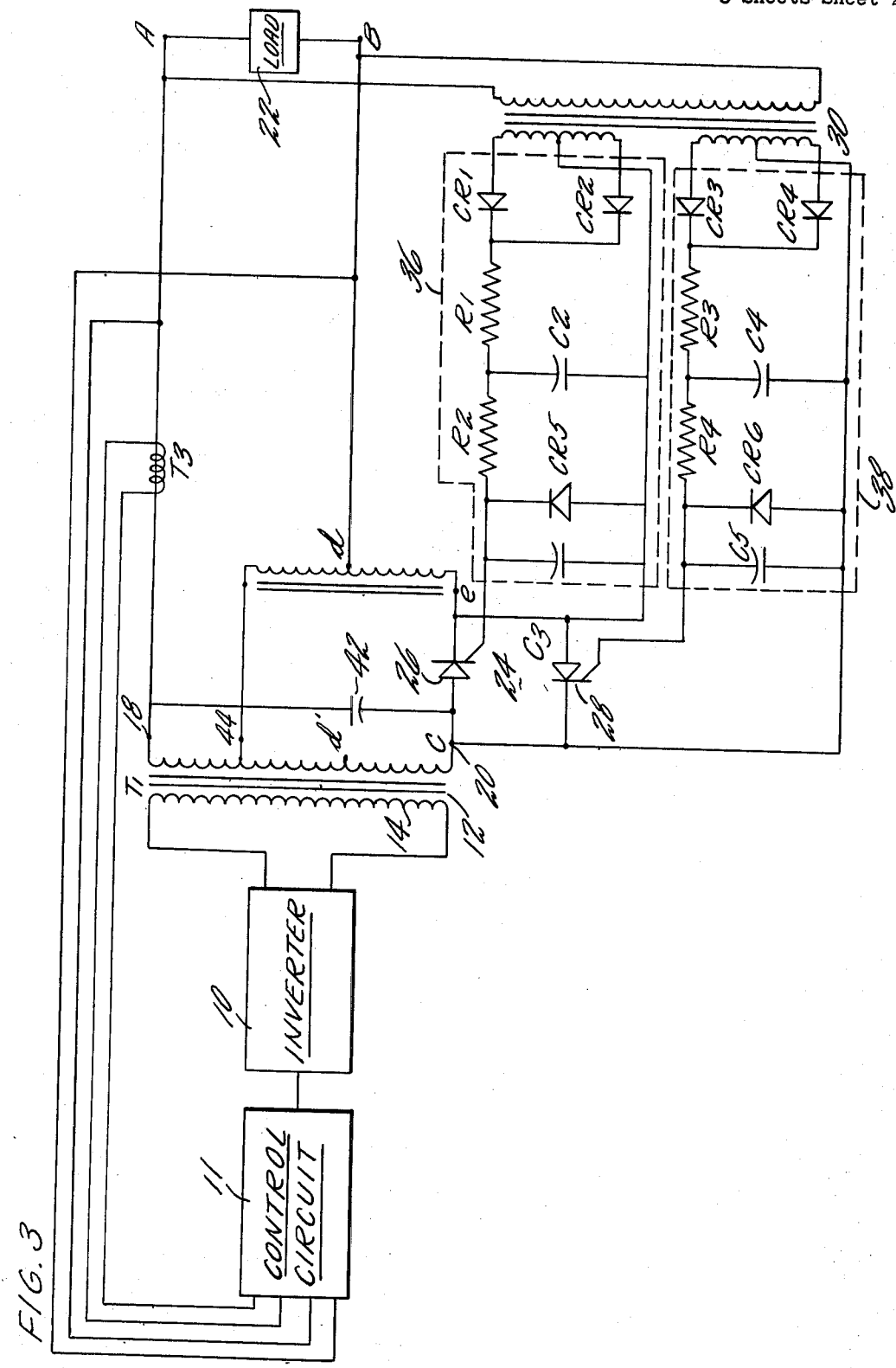
FIG. 3 illustrates an alternate embodiment of this invention.

In FIG. 1 an inverter power stage 10 drives a transformer 12 having a primary 14 and a secondary 16. The primary 14 is driven by the inverter power stage 10 and the secondary of the transformer is coupled from its end taps 18 and 20 to the load 22. In series between the load 22 and the secondary 16 is a switch 24 made up of parallel, oppositely connected silicon controlled rectifiers 26 and 28. These rectifiers are similar to the switch rectifier described in the Powell patent. Gate drives for the switch 24 are obtained from a voltage transformer 30 connected across the load 22 and is essentially as shown and described in the Powell patent. The controlled rectifiers 26 and 28 are each provided with a control electrode 32 and 34 and the bias voltages for these electrodes are obtained from the gate drives 36 and 38. The biasing of the control electrodes are positive relative to the cathode of the controlled rectifiers; and since the rectifiers are connected in opposition to one another, two separate DC isolated gate drives are provided.

The inverter power stage 10 may be, as for instance, shown in FIGS. 2 and 3 of the patent to Brahm 3,260,-921. In this Brahm patent the output power stage includes two transistors connected in push-pull arrangement across a primary winding of a transformer as in FIG. 1. In FIG. 1 a control 11 is provided for current and voltage regulation of the inverter. Accordingly, a current sensor 13 and a voltage sensor input along the lines 15 and 17 are shown connected to the control circuit 11. The control may be, as for instance, for a pulse width modulated inverter according to well-known conventional means.

The primary of the transformer 12 is provided with a first number of turns N1 and the secondary is provided with N2 turns between the end taps 18 and 20. An intermediate tap 44 is located in the secondary of transformer 12 and N3 turns away from end tap 20. Connected to the intermediate tap 44 is an inductance 40 which has its other end coupled to the common junction of the switch 24 and the load 22. A capacitor 42 is connected across the load 22 to tune out inductive reactance introduced by the transformer 12 and the inductance 40.

The turns ratio between the total secondary 16 and the primary 1 and 14 is N2/N1 and the turns ratio in the portion 19 between intermediate tap 44 and end tap 20 has a turn ratio relative to the primary of N3/N1. The turns ratio N3/N1 is smaller than the turns ratio N2/N1. During normal operations the gate drives 36 and 38 provide sufficient biasing power to energize control electrodes 32 and 34 to render the controlled rectifiers 28 and 26 conductive so that the switch 24 is closed and normal current flow to the load is permitted.

Upon the occurrence of a high power demand by the load 22, such as, for instance, represented by a short circuit, the voltage across the load will drop in view of the inability of the inverter power stage 10 to provide the short circuit. The drop in voltage across the load results in a loss of the excitation on the control electrodes and the controlled rectifiers 26 and 28 will extinguish shortly after the short circuit has occurred. The opening of the switch 24 thereupon connects the load 22 through the inductance 40 and the intermediate tap 44 to the transformer 12. The inductance 40 aids in the immediate reduction of the load current and the switch to the tap 44 effectively reduces the transformer short circuit turns ratio. The primary short circuit current is reduced in accordance with the reduction of the turns ratio by the use of the intermediate tap 44.

In a typical example a 28-volt DC supply is used to drive the inverter power stage 10 and 115-volt AC load voltage is to be generated at the secondary of the transformer 12. Accordingly, the normal turns ratio for the transformer is approximately $4/1=N2/N1$. Suppose then that the intermediate tap 44 is located at the midpoint of the secondary winding 16 so that the turns ratio $N3/N1$ is two to one. If then the rated secondary current is one half an ampere then the rated primary current is determined by the well-known ampere low. $N1\ I1 = N2\ I2$.

This yields a rated primary current of two amperes with the switch 24 closed. If now the short condition arises and the overload current required by the load doubles to two amperes and the switch 24 opens in response to the recognition by the gate drive networks 38 and 36 of the short circuit, then the primary current still remains at the rated value of two amperes. In this manner further reductions of the normal operating turns ratio $N2/N1$ may be used to assure that the rated primary current will not be exceeded by short circuits in the load. This, thereupon, permits the use of lower rated transistors in the inverter power stage 10 with a substantial reduction in the cost of these ordinarily high priced and high current transistors.

In the single switch version of FIG. 1, the short circuit choke 40 is always across a portion of the output transformer 12 and, therefore, draws undesirable inductive volt-amperes during normal operation. Although the capacitor 42 may be added to tune out this lagging load, overall efficiency is lowered and a moderately bulky capacitor 42 is required.

Accordingly, FIG. 2 introduces a two-switch version. Again, the gate drives 36 and 38 are used in a similar manner with a switch 24 like FIG. 1. In adidtion, a transformer 43 has its primary 46 coupled across the switch 24 and its secondary 48 coupled in a similar manner as transformer 30 to generate gate drives for two controlled rectifiers 50 and 52. The controlled rectifiefirs 50 and 52 are also connected in parallel but oppositely, and placed in series with the choke 40 and between the intermediate tap 44 and the common junction between the load 22 and the switch 24.

In this instance, however, the transformer 43 is driven by the voltage produced across the switch 24 when that is open. Hence, no biasing voltages are generated from the gating drives 54 and 56 to render the controlled rectifiers 50 and 52 conductive as long as switch 24 is closed. Upon the occurrence of a high current demand from the load 22 or a short circuit condition, the switch 24 is opened and a voltage now appears across the switch 24 to bias the control electrodes of the SCR's 50 and 52 forwardly so that the switch 53 is closed. Thus if for instance the tap 44 is so placed that the turns ratio between the remaining usable portion of the secondary 19 is one-third of that of the normally used portion of the secondary, then a 300 percent short circuit current can be tolerated in the secondary without exceeding the normal current ratings for the inverter power stage amplifier 10.

The advantage of the circuit of FIG. 2 and, therefore, the preferred embodiment is that the inductor 40 may be sized on the basis of low duty cycle usage rather than upon the full-time operation of FIG. 1. Further, the short circuit inductor may be replaced by a resistor, a capacitor, or any other device capable of supporting the voltage V1 across the remaining portion 19 while conducting the short circuit current. In some cases this impedance 40 may even be dispensed with or equal to zero ohms.

FIG. 3 illustrates an alternate embodiment of this invention. Again, similarly numbered items to those of FIGS. 1 and 2 represents similar functions. The gate drives 36 and 38 normally render the switch 24 conductive. Transformer 21 is connected in parallel with transformer 12 and supplies a voltage to the load proportional to the number of turns between tap 18 and point $d^1$ where the point $d^1$ on transformer 12 is at the same potential as point $d$ on transformer 21.

When a short circuit occurs, transformer 30 is no longer energized and the switch 24 is no longer gated on so that tap 20 is no longer connected to point $d$ of transformer 21. The section between the intermediate tap 44 and the point $d$ on the transformer 21 now becomes a series current limiting choke similar in function to the choke 40 of FIG. 1. The secondary turns ratio relative to the primary has been reduced from that between end tap 18 and point $d^1$ to that between intermediate tap 44 and end tap 18.

The configurations of FIGS. 1, 2, and 3 all include a switch connected in the secondary of the transformer 12. When the switch is opened, the secondary to primary turns ratio is reduced and this effectively subtracts inductance from the secondary winding. FIG. 4 illustrates an arrangement where the turns ratio reduction is accomplished by a switch operative in the primary of transformer 12 and where inductance is effectively added to the primary winding 14.

In FIG. 4 similarly numbered items perform similar functions to those described in relation to the previous figures. The transformer 12 has its primary winding 14 coupled to the inverter power stage 10 through the normally closed switch 24 or when this is open through the inductance of choke 40 and the primary portion 15. The gate drive 37 includes the gate drives 36 and 38 of FIG. 1 and is energized in a similar manner by a transformer 30. When a short circuit occurs, the voltage across the load 22 drops sufficiently to effectively remove the drive for the switch 24, which thereupon opens. Thereafter, the inverter 10 is coupled to the transformer 12 through the inductance 40 and the other portion of the primary winding 15. The addition of the inductance 15 to the primary side of the transformer 12 reduces the turns ratio of the secondary winding relative to the primary. The double switch arrangement of FIG. 2 may be employed with the primary switch 24 of FIG. 4 but then the second switch 53 is placed in series with the inductance 40 and the additional primary winding inductance 15.

In FIG. 5 the high power condition is sensed by monitoring the current demanded by the load through a current transformer 21. The output of the current transformer 21 is rectified in rectifier 23 to provide a DC control signal. The DC signal from rectifier 23 is coupled to one input of a comparator amplifier 25. The other input of comparator 25 is driven by a reference circuit 27. The reference circuit 27 produces an output voltage of a predetermined value that corresponds to a short circuit condition in the load 22. The comparator amplifier 25 maintains the switch 24 normally closed as long as the input from rectifier 23 is less than the reference voltage from reference circuit 27. As soon as the short condition in load 22 arises the output from rectifier 23 exceeds the reference voltage and the output voltage from comparator amplifier 25 is adjusted to zero or effectively removes the gating signals for the switch 24. Such an analog switching function may be obtained for instance from the circuits described in a copending application by Gugliotti and Wells and entitled, "Operational Amplifier Analog Logic Functions," Ser. No. 555,815, filed June 7, 1966, and assigned to the same assignee. The overriding reference voltage maintains the switch 24 closed for all normal conditions including "no-load." The effective operation of this arrangement is the same as for FIG. 1 in that the switch 24 is normally maintained closed or opened in response to the current demanded by the load.

In FIG. 1 the switch controlling means is a voltage transformer driven by the voltage across the load. In effect, however, FIG. 1 also contains a built in reference voltage, i.e., that gate voltage below which the switch 24 is opened. Thus redrawing FIG. 1 in a general manner as in FIG. 6 yields a reference circuit 31 producing a voltage signal indicative of a preselected voltage across the load 22. A voltage load sensor 35, comprising an arrangement such as a gate drive 36 in FIG. 2 with a voltage transformer 30 is coupled with the reference voltage to a comparator 33. The comparator in this case is adjusted so that the voltage from sensor 33 normally maintains switch 24 closed by overriding the reference voltage 31. In the event of a short circuit condition, the reference voltage 31 exceeds the load voltage and the comparator 33 produces a switch opening signal. In FIG. 1 the switch opening signal is the same as the reference voltage, i.e., zero volts.

Having thus described our invention and illustrated a preferred embodiment, we recognize that variations of the particular embodiments are possible without escaping the principle of operation and scope of our invention.

We claim:

1. A device for protecting a source of AC power from excessive power demands from a load connected to the AC power source comprising:
  a transformer having a primary winding of N1 turns coupled to the source and having a secondary winding of N2 turns coupled to the load, said secondary winding bearing a turns ratio of $N2/N1$ to the primary winding during normal operations.
  means for selectively reducing said turns ratio to a predetermined value,
  normally closed switch means effectively coupled through a portion of the transformer in parallel with said turns ratio reducing means, and
  switch controlling means for effectively and normally maintaining said switch means closed and opening said switch means during excessive power demands by the load.

2. A device as recited in claim 1 wherein said switch controlling means further comprises:
  a voltage transformer having a primary and a secondary, with the primary electrically coupled to the load voltage and the secondary electrically coupled to the normally closed switch means,
  and rectifying means coupling the secondary of the voltage transformer to the switch means for control thereof.

3. A device as recited in claim 1 wherein said switch controlling means further comprises:
  means effectively responsive to the current flowing to the load for producing a signal indicative thereof.
  means generating a reference signal indicative of a preselected current condition in the load,
  comparing means responsive to the load current signal and the reference signal for controlling the switch means and producing a switch closing signal when the load current signal is less than the reference signal and producing a switch opening signal when the load current signal is greater than the reference signal.

4. A device as recited in claim 1 wherein said switch controlling means further comprises:
  means effectively responsive to the voltage across the load for producing a signal indicative thereof,
  means generating a reference signal indicative of a preselected voltage across the load,
  comparing means responsive to the load voltage signal and the reference signal for controlling the switch means and producing a switch closing signal when the load voltage signal is greater than the reference signal and producing a switch opening signal when the load voltage signals is less than the reference signal.

5. A device as recited in claim 1 wherein said turns ratio reducing means comprises:
  an inductance coupled between the primary winding of said transformer and said AC power source, and wherein said switch means during normal operation effectively short circuits said inductance and effectively adds said inductance to the primary winding during said excessive load power demands.

6. A device as recited in claim 1 wherein said turns ratio reducing means comprises:
  means providing said secondary winding with an intermediate tap and two end taps,
  one of said end taps being electrically coupled to said load,
  said switch means electrically couping the other of said end taps to said load,
  an inductive reactance electrically coupled between said intermediate tap and the load side of said switch means.

7. A device for protecting a source of AC power from excessive power demands from a load connected thereto comprising:
  a transformer having a primary winding coupled to the AC source and having a secondary winding coupled to the load,
  said secondary winding being provided with a pair of end taps and an intermediate tap,
  said end taps being normally effectively coupled to the load,
  normally closed switch means interposed between one of said end taps and the load,
  an inductive reactance coupled to the intermediate tap and effectively coupled in parallel with said switch means,
  and means responsive to the load current or load voltage for opening said normally closed switch means.

8. A device as recited in claim 7 wherein the switch means comprises:
  a pair of parallel oppositely connected controlled rectifiers, each having a control electrode, and
  wherein said switch opening means comprises,
  means coupled to the load voltage and normally producing a gating voltage responsive thereto, and applying said gating voltage for biasing said pair of controlled rectifiers towards conduction and for effectively removing said gating voltage when said load voltage drops in response to excessive power demands from the load.

9. A device for protecting a source of AC power from excessive current demanded from a load driven thereby, comprising:
  a transformer having a primary winding of N1 turns coupled to the source and having a secondary winding of normally effective N2 turns coupled to the load,
  said secondary winding bearing a first turns ratio of $N2/N1$ to the primary winding,
  said secondary winding further having a high current carrying portion of N3 turns for high load current conditions, said high current carrying portion bearing a second turns ratio of $N3/N1$ to the primary winding,
  where said second turns ratio is smaller than said first turns ratio,
  normally closed switch means normally coupling the secondary winding with the first turns ratio to the load, and
  means responsive to the load current or load voltage for opening said switch means and effectively couple the high current carrying portion of the secondary winding with the second turns ratio to the load.

10. A device as recited in claim 9 and further including an inductance coupled between said high current carrying portion and the load.

11. A device as recited in claim 10 wherein said switch means comprises:
  a pair of mutually oppositely connected controlled rectifiers, a load voltage actuated biasing supply for rendering said pair of controlled rectifiers conductive, and where said controlled rectifiers are rendered non-conductive upon a predetermined drop in said load voltage.

References Cited

UNITED STATES PATENTS

| | | | |
|---|---|---|---|
| 3,040,239 | 6/1962 | Walker | 323—43.5 X |
| 3,323,017 | 5/1967 | Powell et al. | 317—20 |
| 3,340,462 | 9/1967 | Ebersohl | 323—43.5 |
| 3,388,319 | 6/1968 | Paynter | 323—43.5 |

LEE T. HIX, Primary Examiner

J. D. TRAMMELL, Assistant Examiner

U.S. Cl. X.R.

317—20, 33; 321—11; 323—43.5